United States Patent
Yasui et al.

(10) Patent No.: US 11,814,518 B2
(45) Date of Patent: Nov. 14, 2023

(54) POLYAMIDE RESIN COMPOSITION

(71) Applicant: UBE CORPORATION, Ube (JP)

(72) Inventors: Tetsuya Yasui, Ube (JP); Atsushi Yamashita, Ube (JP)

(73) Assignee: UBE CORPORATION, Ube (JP)

(*) Notice: Subject to any disclaimer, the term of this patent is extended or adjusted under 35 U.S.C. 154(b) by 316 days.

(21) Appl. No.: 17/274,061

(22) PCT Filed: Jul. 31, 2019

(86) PCT No.: PCT/JP2019/030031
§ 371 (c)(1),
(2) Date: Mar. 5, 2021

(87) PCT Pub. No.: WO2020/049907
PCT Pub. Date: Mar. 12, 2020

(65) Prior Publication Data
US 2021/0347991 A1 Nov. 11, 2021

(30) Foreign Application Priority Data
Sep. 7, 2018 (JP) .................................. 2018-167678

(51) Int. Cl.
C08L 77/02 (2006.01)
B29C 48/00 (2019.01)
B29C 48/05 (2019.01)
B29K 77/00 (2006.01)
B29K 105/00 (2006.01)

(52) U.S. Cl.
CPC ............ *C08L 77/02* (2013.01); *B29C 48/022* (2019.02); *B29C 48/05* (2019.02); *B29K 2077/00* (2013.01); *B29K 2105/0026* (2013.01); *C08L 2201/08* (2013.01); *C08L 2205/025* (2013.01); *C08L 2205/035* (2013.01)

(58) Field of Classification Search
CPC ........... C08L 23/0876; C08L 2205/025; C08L 2205/03; C08L 2205/035; C08L 77/00; C08L 77/06; C08L 77/02; C08L 77/04
See application file for complete search history.

(56) References Cited

U.S. PATENT DOCUMENTS

| | | | |
|---|---|---|---|
| 5,674,852 A | 10/1997 | Onishi et al. | |
| 5,674,952 A | 10/1997 | Onishi et al. | |
| 6,294,602 B1* | 9/2001 | Shimo | B65D 35/02 525/190 |
| 2004/0242737 A1 | 12/2004 | Topulos | |
| 2011/0318590 A1* | 12/2011 | Maki | B32B 27/36 156/244.11 |

FOREIGN PATENT DOCUMENTS

| | | |
|---|---|---|
| JP | 5-105753 A | 4/1993 |
| JP | 2002-534547 A | 10/2002 |
| JP | 2006-523763 A | 10/2006 |
| JP | 2007-204674 A | 8/2007 |
| JP | 4983004 B2 | 7/2012 |
| WO | W O00/40649 A1 | 7/2000 |

OTHER PUBLICATIONS

Extended European Search Report for European Application No. 19857393.3, dated Jun. 1, 2022.
International Search Report for PCT/JP2019/030031 dated Nov. 5, 2019.

* cited by examiner

*Primary Examiner* — Ana L. Woodward
(74) *Attorney, Agent, or Firm* — Birch, Stewart, Kolasch & Birch, LLP

(57) ABSTRACT

A polyamide resin composition is provided which can be blow molded while concurrently satisfying blow moldability and uniform wall thickness of the molten resin, exhibits excellent thermal stability when the resin composition is accumulated as a melt and thereby gives molded articles with a good surface appearance, and is further excellent in impact resistance at room and low temperatures. The polyamide resin composition includes, based on 100 mass % of the polyamide resin composition, 40 to 84 mass % of a polyamide resin (A), not less than 15 mass % of an olefin-based ionomer (B), 0 to 10 mass % of an impact modifier (C), and 0.1 to 3 mass % of heat resistant agents (D). The polyamide resin (A) includes at least one selected from the group consisting of aliphatic copolyamides (A-1) and aromatic copolyamides (A-2). The heat resistant agents (D) include two or more kinds of organic hindered phenol heat resistant agents (D-1).

6 Claims, No Drawings

POLYAMIDE RESIN COMPOSITION

TECHNICAL FIELD

The present invention relates to polyamide resin composition.

BACKGROUND ART

The use of polyamide resins as engineering plastics has broadened to a wide range of applications because of their excellent mechanical characteristics, heat resistance and chemical resistance, and is manifested by way of various molding methods. In particular, polyamide resins are increasingly used as blow molded articles produced by blow molding. Large blow molded articles are desired for use as fuel containers in FCV (fuel cell vehicles) which are expected to expand rapidly in the future.

It is known that polyamide resin composition obtained by adding an acid-modified impact modifier to a polyamide resin come to have an increased viscosity and exhibit excellent blow moldability (see, for example, Patent Literature 1). In the production of large blow molded articles, an accumulator is necessarily mounted in the molding machine due to the need that a large amount of resin be discharged quickly in one shot. If a resin composition containing an acid-modified impact modifier is molded in this system, the resin is grafted with the acid-modified impact modifier during the residence of the molten resin in the accumulator. The polyamide resin composition of Patent Literature 1 contains a large amount of an acid-modified impact modifier, and more grafts are formed to deteriorate the surface appearance of molded articles.

Meanwhile, as known in the art, polyamide resin composition obtained by adding an ionomer to a polyamide resin attain high viscosity and are suitable for blow molding, and also have excellent impact resistance (see, for example, Patent Literature 2).

CITATION LIST

Patent Literature

Patent Literature 1: Japanese Patent No. 4983004
Patent Literature 2: Japanese Patent Kohyo Publication No. 2006-523763

SUMMARY OF INVENTION

Technical Problem

As described above, high melt viscosity is conventionally required in blow molding in order to ensure maintaining the desired parison. It is, however, difficult for conventional polyamide resin composition to achieve concurrently a high melt viscosity and a uniform wall thickness. Further, the conventional polyamide resin composition still have room for improvement in thermal stability during residence in a blow molding machine.

An object of the present invention is to provide a polyamide resin composition which can be blow molded while concurrently satisfying blow moldability and uniform wall thickness of the molten resin, exhibits excellent thermal stability when the resin composition is accumulated as a melt and thereby gives molded articles with a good surface appearance, and is further excellent in impact resistance at room and low temperatures.

Solution to Problem

For example, the present invention pertains to the following.

[1] A polyamide resin composition comprising, based on 100 mass % of the polyamide resin composition, 40 to 84 mass % of a polyamide resin (A), not less than 15 mass % of an olefin-based ionomer (B), 0 to 10 mass % of an impact modifier (C), and 0.1 to 3 mass % of heat resistant agents (D),
the polyamide resin (A) comprising at least one selected from the group consisting of aliphatic copolyamides (A-1) and aromatic copolyamides (A-2),
the heat resistant agents (D) comprising two or more kinds of organic hindered phenol heat resistant agents (D-1).

[2] The polyamide resin composition described in [1], wherein the heat resistant agents (D) further comprise a phosphorus heat resistant agent (D-2).

[3] The polyamide resin composition described in [1] or [2], wherein the polyamide resin composition comprises an aliphatic copolyamide (A-1), an aromatic copolyamide (A-2) and an aliphatic homopolyamide (A-3) as the polyamide resins (A).

[4] The polyamide resin composition described in any of [1] to [3], wherein the olefin-based ionomer (B) has a melting point of 75 to 100° C., a density of 940 to 980 kg/m$^3$, and a content of zinc element of not less than 3 mass % as measured by inductively coupled plasma-optical emission spectrometry.

[5] The polyamide resin composition described in any of [1] to [4], wherein the impact modifier (C) is at least one selected from the group consisting of (ethylene and/or propylene)/α-olefin-based copolymers and (ethylene and/or propylene)/(α,β-unsaturated carboxylic acid and/or unsaturated carboxylic acid ester)-based copolymers.

[6] The polyamide resin composition described in any of [1] to [5], wherein when the resin is extruded into a 15 cm strand at a measurement temperature of 250° C. and a shear rate of 121.6 sec$^{-1}$ in accordance with ISO 11443 using a capillary rheometer having a capillary die 1.0 mm in inner diameter and 10 mm in length, the strand being then sampled and solidified by cooling at room temperature for 24 hours, the diameter of the strand is less than 3.00 mm.

Advantageous Effects of Invention

The polyamide resin composition provided according to the present invention can be blow molded while concurrently satisfying blow moldability and uniform wall thickness of the molten resin, exhibits excellent thermal stability when the resin composition is accumulated as a melt and thereby gives molded articles with a good surface appearance, and is further excellent in impact resistance at room and low temperatures.

EMBODIMENTS OF INVENTION

A polyamide resin composition of the present invention comprises, based on 100 mass % of the polyamide resin composition, 40 to 84 mass % of a polyamide (A), not less than 15 mass % of an olefin-based ionomer (B), 0 to 10 mass % of an impact modifier (C), and 0.1 to 3 mass % of heat resistant agents (D),
the polyamide resin (A) comprising at least one selected from the group consisting of aliphatic copolyamides (A-1) and aromatic copolyamides (A-2), the heat resistant agents (D) comprising two or more kinds of organic hindered phenol heat resistant agents (D-1).

(A) Polyamide Resins

The polyamide resin (A) contained in the polyamide resin composition comprises at least one selected from the group consisting of aliphatic copolyamides (A-1) and aromatic copolyamides (A-2). By comprising at least one selected from the group consisting of aliphatic copolyamides (A-1) and aromatic copolyamides (A-2), the polyamide resin composition attains excellent strength at a pinched-off portion when being blow molded, and gives molded articles with a uniform wall thickness.

The polyamide resins (A) preferably further comprise an aliphatic homopolyamide (A-3).

(A-1) Aliphatic Copolyamides

The aliphatic copolyamide (A-1) is a polyamide resin including two or more kinds of aliphatic structural units. The aliphatic copolyamide (A-1) is a copolymer of two or more kinds of monomers selected from the group consisting of combinations of a diamine and a dicarboxylic acid, lactams and aminocarboxylic acids. Here, the combinations of a diamine and a dicarboxylic acid are understood such that one diamine and one dicarboxylic acid in combination constitute a single monomer.

Examples of the diamines include aliphatic diamines such as ethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tridecanediamine, tetradecanediamine, pentadecanediamine, hexadecanediamine, heptadecanediamine, octadecanediamine, nonadecanediamine, eicosanediamine, 2-methyl-1,8-octanediamine and 2,2,4-/2,4,4-trimethylhexamethylenediamine; and alicyclic diamines such as 1,3-/1,4-cyclohexyldiamine, bis(4-aminocyclohexyl)methane, bis(4-aminocyclohexyl)propane, bis(3-methyl-4-aminocyclohexyl)methane, (3-methyl-4-aminocyclohexyl)propane, 1,3-/1,4-bisaminomethylcyclohexane, 5-amino-2,2,4-trimethyl-1-cyclopentanemethylamine, 5-amino-1,3,3-trimethylcyclohexanemethylamine, bis(aminopropyl)piperazine, bis(aminoethyl)piperazine and norbornanedimethyleneamine. Among these, from the point of view of polymerization productivity, at least one selected from the group consisting of aliphatic diamines is preferable, at least one selected from the group consisting of linear aliphatic diamines is more preferable, and hexamethylenediamine is still more preferable.

The diamines may be used singly, or two or more may be used in appropriate combination.

Examples of the dicarboxylic acids include aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid and eicosanedioic acid; and alicyclic dicarboxylic acids such as 1,3-/1,4-cyclohexanedicarboxylic acid, dicyclohexanemethane-4,4'-dicarboxylic acid and norbornanedicarboxylic acid. The dicarboxylic acids may be used singly, or two or more may be used in appropriate combination.

Examples of the lactams include ε-caprolactam, enantholactam, undecanelactam, dodecanelactam, α-pyrrolidone and α-piperidone. Among these, from the point of view of polymerization productivity, at least one selected from the group consisting of ε-caprolactam, undecanelactam and dodecanelactam is preferable.

Examples of the aminocarboxylic acids include 6-aminocaproic acid, 7-aminoheptanoic acid, 9-aminononanoic acid, 11-aminoundecanoic acid and 12-aminododecanoic acid. Among these, from the point of view of polymerization productivity, at least one selected from the group consisting of 6-aminocaproic acid, 11-aminoundecanoic acid and 12-aminododecanoic acid is preferable.

Specific examples of the aliphatic copolyamides (A-1) include such aliphatic copolyamides as caprolactam/hexamethylenediaminoadipic acid copolymer (polyamide 6/66), caprolactam/hexamethylenediaminoazelaic acid copolymer (polyamide 6/69), caprolactam/hexamethylenediaminosebacic acid copolymer (polyamide 6/610), caprolactam/hexamethylenediaminoundecanedicarboxylic acid copolymer (polyamide 6/611), caprolactam/hexamethylenediaminododecanedicarboxylic acid copolymer (polyamide 6/612), caprolactam/aminoundecanoic acid copolymer (polyamide 6/11), caprolactam/lauryllactam copolymer (polyamide 6/12), caprolactam/hexamethylenediaminoadipic acid/lauryllactam copolymer (polyamide 6/66/12), caprolactam/hexamethylenediaminoadipic acid/hexamethylenediaminosebacic acid copolymer (polyamide 6/66/610) and caprolactam/hexamethylenediaminoadipic acid/hexamethylenediaminododecanedicarboxylic acid copolymer (polyamide 6/66/612).

Among those described above, from the point of view of productivity, at least one selected from the group consisting of polyamide 6/66, polyamide 6/12 and polyamide 6/66/12 is preferable, polyamide 6/66 and polyamide 6/66/12 are more preferable, and polyamide 6/66 is particularly preferable.

The aliphatic copolyamides (A-1) may be used singly, or two or more may be used as a mixture.

The aliphatic copolyamides (A-1) may be produced using known polyamide production apparatuses such as batch-type reactor, single-tank or multi-tank continuous reaction devices, tubular continuous reaction devices, and kneading reaction extruders including single-screw kneading extruders and twin-screw kneading extruders. Polymerization may be performed by a known process such as melt polymerization, solution polymerization or solid-phase polymerization while repeatedly changing the pressure to normal pressure, reduced pressure or increased pressure. These polymerization processes may be used singly or may be appropriately combined.

The relative viscosity of the aliphatic copolyamide (A-1) is not particularly limited. To enhance the advantageous effects of the present invention, it is preferable that the relative viscosity be not less than 1.8 and not more than 5.0 as measured in accordance with JIS K-6920 at 25° C. with respect to a solution of 1 g of the polyamide resin in 100 ml of 96% concentrated sulfuric acid.

The terminal amino group concentration of the aliphatic copolyamide (A-1) is determined by neutralization titration of a solution in a mixed solvent including phenol and methanol. The terminal amino group concentration of the aliphatic copolyamide (A-1) is preferably not less than 30 μmol/g, and more preferably not less than 30 μmol/g and not more than 50 μmol/g.

When the aliphatic copolyamide (A-1) is contained in a polyamide resin (A), the total mass proportion of the aliphatic copolyamide (A-1) in 100 mass % of the polyamide resins (A) is preferably 10 to 50 mass %, and more preferably 20 to 40 mass % from the points of view of mechanical properties and heat resistance.

(A-2) Aromatic Copolyamides

Aromatic polyamide resins are such aromatic polyamide resins that include at least one aromatic monomer component. For example, such a polyamide resin is obtained by polycondensation of ingredients including an aliphatic dicarboxylic acid and an aromatic diamine, ingredients including an aromatic dicarboxylic acid and an aliphatic diamine, or ingredients including an aromatic diamine and an aromatic dicarboxylic acid. The aromatic copolyamides (A-2) are polyamide resins which belong to the above aromatic polyamide resins and are composed of two or more kinds of structural units.

Examples of the aliphatic diamines and the aliphatic dicarboxylic acids used as ingredients include those illustrated in the description of the aliphatic copolyamide resins hereinabove.

Examples of the aromatic diamines include metaxylylenediamine and paraxylylenediamine. Examples of the aromatic dicarboxylic acids include naphthalenedicarboxylic acid, terephthalic acid, isophthalic acid and phthalic acid.

The aromatic diamines and the aromatic dicarboxylic acids may be each used singly, or two or more may be used in appropriate combination.

Specific examples include polyhexamethylene adipamide/polyhexamethylene terephthalamide copolymer (polyamide 66/6T), polyhexamethylene terephthalamide/polycaproamide copolymer (polyamide 6T/6), polyhexamethylene adipamide/polyhexamethylene isophthalamide copolymer (polyamide 66/6I), polyhexamethylene isophthalamide/polycaproamide copolymer (polyamide 6I/6), polydodecamide/polyhexamethylene terephthalamide copolymer (polyamide 12/6T), polyhexamethylene adipamide/polyhexamethylene terephthalamide/polyhexamethylene isophthalamide copolymer (polyamide 66/6T/6I), polyhexamethylene adipamide/polycaproamide/polyhexamethylene isophthalamide copolymer (polyamide 66/6/6I), polyhexamethylene terephthalamide/polyhexamethylene isophthalamide copolymer (polyamide 6T/6I), polyhexamethylene terephthalamide/poly(2-methylpentamethylene terephthalamide) copolymer (polyamide 6T/M5T), and mixtures and copolymer resins thereof. Among these, polyamide 6T/6I is preferable.

A particularly useful aromatic copolyamide (A-2) in the present invention is an amorphous partial aromatic copolyamide resin including at least two aromatic monomer components. The amorphous partial aromatic copolyamide resin is preferably an amorphous polyamide that has a glass transition temperature of not less than 100° C. as measured from the temperature corresponding to the peak-top loss elastic modulus in an absolute dry state determined by dynamic viscoelasticity measurement.

Here, the term amorphous means that the amount of crystal melting heat measured with a differential scanning calorimeter (DSC) is not more than 1 cal/g.

A preferred example of the amorphous partial aromatic copolyamide resins is one composed of aromatic dicarboxylic acids including 40 to 95 mol % of terephthalic acid component units and 5 to 60 mol % of isophthalic acid component units, and an aliphatic diamine. A preferred combination is an equimolar salt of hexamethylenediamine and terephthalic acid, and an equimolar salt of hexamethylenediamine and isophthalic acid.

Another preferred example is one composed of 99 to 60 mass % of polyamide-forming components that include an aliphatic diamine and aromatic dicarboxylic acids including isophthalic acid and terephthalic acid, and 1 to 40 mass % of an aliphatic polyamide component.

The polymerization degree of the aromatic copolyamide resin (A-2) in the present invention is not particularly limited. It is, however, preferable that the relative viscosity measured in accordance with JIS K 6810 at a temperature of the aromatic copolyamide resin (A-2) of 25° C. with respect to a 1% solution in 98% sulfuric acid be 1.5 to 4.0, more preferably 1.8 to 3.0.

When the aromatic copolyamide (A-2) is contained in a polyamide resin (A), the total mass proportion of the aromatic copolyamide (A-2) in 100 mass % of the polyamide resins (A) is preferably 1 to 30 mass %, and more preferably 3 to 20 mass % from the points of view of mechanical properties and molding properties.

(A-3) Aliphatic Homopolyamides

The aliphatic homopolyamide (A-3) is a polyamide resin consisted of structural units from a single kind of an aliphatic amide. The aliphatic homopolyamide (A-3) may be one composed of at least one of a single kind of a lactam and an aminocarboxylic acid that is a hydrolyzate of the lactam, or may be one composed of a combination of a single kind of a diamine and a single kind of a dicarboxylic acid.

The addition of the aliphatic homopolyamide is advantageous from the points of view of mechanical properties, heat resistance and gas barrier properties.

Examples of the lactams include ε-caprolactam, enantholactam, undecanelactam, dodecanelactam, α-pyrrolidone and α-piperidone. Among these, from the point of view of polymerization productivity, one selected from the group consisting of ε-caprolactam, undecanelactam and dodecanelactam is preferable.

Examples of the aminocarboxylic acids include 6-aminocaproic acid, 7-aminoheptanoic acid, 9-aminononanoic acid, 11-aminoundecanoic acid and 12-aminododecanoic acid. Among these, from the point of view of polymerization productivity, one selected from the group consisting of 6-aminocaproic acid, 11-aminoundecanoic acid and 12-aminododecanoic acid is preferable.

Examples of the diamines include aliphatic diamines such as ethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tridecanediamine, tetradecanediamine, pentadecanediamine, hexadecanediamine, heptadecanediamine, octadecanediamine, nonadecanediamine, eicosanediamine, 2-methyl-1,8-octanediamine and 2,2,4/2,4,4-trimethylhexamethylenediamine; and alicyclic diamines such as 1,3-/1,4-cyclohexyldiamine, bis(4-aminocyclohexyl)methane, bis(4-aminocyclohexyl)propane, bis(3-methyl-4-aminocyclohexyl)methane, (3-methyl-4-aminocyclohexyl)propane, 1,3-/1,4-bisaminomethylcyclohexane, 5-amino-2,2,4-trimethyl-1-cyclopentanemethylamine, 5-amino-1,3,3-trimethylcyclohexanemethylamine, bis(aminopropyl)piperazine, bis(aminoethyl)piperazine and norbornanedimethylenediamine. Among these, from the point of view of polymerization productivity, an aliphatic diamine is preferable, and hexamethylenediamine is more preferable.

Examples of the dicarboxylic acids include aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid and eicosanedioic acid; and alicyclic dicarboxylic acids such as 1,3-/1,4-cyclohexanedicarboxylic acid, dicyclohexanemethane-4,4'-dicarboxylic acid and norbornanedicarboxylic acid. Among these, an aliphatic dicarboxylic acid is preferable, one selected from the group consisting of adipic acid, sebacic acid and dodecanedioic acid is more preferable, and sebacic acid or dodecanedioic acid is still more preferable.

Specific examples of the aliphatic homopolyamides (A-3) include polycaprolactam (polyamide 6), polyenantholactam (polyamide 7), polyundecanelactam (polyamide 11), polylauryllactam (polyamide 12), polyhexamethylene adipamide (polyamide 66), polytetramethylene dodecamide (polyamide 412), polypentamethylene azelamide (polyamide 59), polypentamethylene sebacamide (polyamide 510), polypentamethylene dodecamide (polyamide 512), polyhexamethylene azelamide (polyamide 69), polyhexamethylene sebacamide (polyamide 610), polyhexamethylene dodecamide (polyamide 612), polynonamethylene adipamide (polyamide 96), polynonamethylene azelamide (polyamide 99), polynonamethylene sebacamide (polyamide 910), polynonamethylene dodecamide (polyamide 912), polydecamethylene adipamide (polyamide 106), polydecamethylene azelamide (polyamide 109), polydecamethylene decamide (polyamide 1010), polydecamethylene dodecamide (polyamide 1012), polydodecamethylene adipamide (polyamide 126), polydodecamethylene azelamide (polyamide 129), polydodecamethylene sebacamide (polyamide 1210), polydodecamethylene dodecamide (polyamide 1212) and polyamide 122. The aliphatic homopolyamides (A-3) may be used singly, or two or more may be used in combination as a mixture.

In particular, from the point of view of polymerization productivity, the aliphatic homopolyamide (A-3) is preferably at least one selected from the group consisting of polyamide 6, polyamide 11, polyamide 12, polyamide 66, polyamide 610 and polyamide 612, more preferably at least one selected from polyamide 6, polyamide 11, polyamide 12, polyamide 610 and polyamide 612, and still more preferably polyamide 6.

The aliphatic homopolyamides (A-3) may be produced using known polyamide production apparatuses such as batch-type reactor, single-tank or multi-tank continuous reaction devices, tubular continuous reaction devices, and kneading reaction extruders including single-screw kneading extruders and twin-screw kneading extruders. Polymerization may be performed by a known process such as melt polymerization, solution polymerization or solid-phase polymerization while repeatedly changing the pressure to normal pressure, reduced pressure or increased pressure. These polymerization processes may be used singly or may be appropriately combined.

The relative viscosity of the aliphatic homopolyamide (A-3) is measured in accordance with JIS K-6920 at 25° C. with respect to a solution of 1 g of the polyamide resin in 100 ml of 96% concentrated sulfuric acid. The relative viscosity of the aliphatic homopolyamide resin is preferably not less than 2.7, and more preferably not less than 2.7 and not more than 5.0. To further enhance the advantageous effects of the present invention, the relative viscosity is more preferably not less than 2.7 and less than 4.5. When the relative viscosity is 2.7 or above, the polyamide composition shows a melt viscosity that is not excessively low, and thus can be extruded while excellently maintaining the shape of the extrudate and, in particular, can be blow molded while excellently maintaining the shape of the parison. When the relative viscosity is 5.0 or less, the polyamide composition shows a melt viscosity that is not excessively high, and thus can be blow molded while ensuring that the wall thickness of the molten resin is uniform.

The terminal amino group concentration of the aliphatic homopolyamide (A-3) is determined by neutralization titration of a solution in a mixed solvent including phenol and methanol. The terminal amino group concentration of the aliphatic homopolyamide (A-3) is preferably not less than 30 µmol/g, and more preferably not less than 30 µmol/g and not more than 50 µmol/g.

When the aliphatic homopolyamide (A-3) is contained in a polyamide resin (A), the total mass proportion of the aliphatic homopolyamide (A-3) in 100 mass % of the polyamide resins (A) is preferably 40 to 85 mass %, and more preferably 50 to 80 mass % from the points of view of mechanical properties, heat resistance and gas barrier properties.

From the points of view of the mechanical properties and gas barrier properties of molded articles, and blow moldability, it is preferable that the polyamide resins (A) include a combination of an aliphatic copolyamide (A-1) and an aromatic copolyamide (A-2), more preferably a combination of an aliphatic copolyamide (A-1), an aromatic copolyamide (A-2) and an aliphatic homopolyamide (A-3). This combination is preferably a combination of at least one selected from the group consisting of polyamide 6/66, polyamide 6/12 and polyamide 6/66/12 as the aliphatic copolyamide (A-1), and polyamide 6T/6I as the aromatic copolyamide (A-2), and more preferably further includes, in addition to the above combination, at least one selected from the group consisting of polyamide 6, polyamide 11, polyamide 12, polyamide 66, polyamide 610 and polyamide 612 as the aliphatic homopolyamide (A-3). A more preferred combination includes polyamide 6/66 as the aliphatic copolyamide (A-1), polyamide 6T/6I as the aromatic copolyamide (A-2), and polyamide 6 as the aliphatic homopolyamide (A-3).

The relative viscosity of the polyamide resin (A) measured in accordance with JIS K-6920 at 25° C. with respect to a solution of 1 g of the polyamide resin in 100 ml of 96% concentrated sulfuric acid is not less than 2.7, and preferably not less than 2.7 and not more than 5.0. To further enhance the advantageous effects of the present invention, the relative viscosity is more preferably not less than 2.7 and less than 4.5. When the relative viscosity is 2.7 or above, the polyamide composition shows a melt viscosity that is not excessively low, and thus can be extruded while excellently maintaining the shape of the molded article and can be blow molded while excellently maintaining the shape of the parison. When the relative viscosity is 5.0 or less, the polyamide composition shows a melt viscosity that is not excessively high, and thus can be blow molded while ensuring that the wall thickness of the molten resin is uniform.

In the case where the polyamide resins (A) include two or more kinds of polyamide resins having different relative viscosities (for example, at least one kind of an aliphatic homopolyamide (A-3) and at least one kind of an aliphatic copolyamide (A-1)), the relative viscosity of the whole of the polyamide resins (A) is preferably measured as described above. When, however, the relative viscosities and mixing ratios of the respective polyamide resins are known, the relative viscosity of the polyamide resins (A) may be determined by multiplying each of the relative viscosities by the mixing ratio and combining the products to give the average value.

From the point of view of the reactivity with an impact modifier (C), the terminal amino group concentration of the polyamide resin (A) determined by neutralization titration of a solution in a mixed solvent including phenol and methanol is not less than 30 µmol/g, preferably in the range of not less than 30 μmol/g and not more than 110 μmol/g, and more preferably in the range of not less than 30 μmol/g and not more than 70 μmol/g. When the terminal amino group concentration is 30 μmol/g or above, the resin exhibits good reactivity with the impact modifier (C) to offer sufficient melt viscosity and impact resistance. When the terminal amino group concentration is 110 μmol/g or less, the melt viscosity does not become excessively high and good molding processability is obtained.

In the case where the polyamide resins (A) include two or more kinds of polyamide resins having different terminal amino group concentrations (for example, at least one kind of an aliphatic homopolyamide (A-3) and at least one kind of an aliphatic copolyamide (A-1)), the terminal amino group concentration of the whole of the polyamide resins (A) is preferably measured by neutralization titration as described above. When, however, the terminal amino group concentrations and mixing ratios of the respective polyamide resins are known, the terminal amino group concentration of the polyamide resins (A) may be determined by multiplying each of the terminal amino group concentrations by the mixing ratio and combining the products to give the average value.

Based on 100 mass % of the polyamide resin composition, the content of the polyamide resin (A) is 40 to 84 mass %, preferably 40 to 80 mass %, preferably 50 to 80 mass %, more preferably 60 to 80 mass %, still more preferably 65 to 80 mass %, and particularly preferably 65 to 75 mass %. By virtue of the polyamide resin (A) representing 40 mass % or more, good mechanical properties and heat resistance are obtained. As a result of the content being 84 mass % or less, good low-temperature properties and blow moldability are obtained.

(B) Olefin-Based Ionomers

The polyamide resin composition includes an olefin-based ionomer (B). The olefin-based ionomer is a copolymer of an olefin and an α,β-unsaturated carboxylic acid and/or an α,β-unsaturated carboxylic acid ester, neutralized with a metal or a metal ion. The addition of the olefin-based ionomer (B) offers marked enhancements in parison characteristics at the time of blow molding without being accompanied by a significant increase in melt viscosity, and thus results in enhanced productivity. Examples of the resins in the olefin-based ionomers (B) include (ethylene and/or propylene)/(α,β-unsaturated carboxylic acid and/or unsaturated carboxylic acid ester) copolymers. These may be used singly, or two or more may be used in combination. The (ethylene and/or propylene)/(α,β-unsaturated carboxylic acid and/or unsaturated carboxylic acid ester) copolymers are polymers obtained by copolymerizing ethylene and/or propylene with an α,β-unsaturated carboxylic acid monomer and/or an α,β-unsaturated carboxylic acid ester monomer. Examples of the α,β-unsaturated carboxylic acid monomers include acrylic acid and methacrylic acid. Examples of the α,β-unsaturated carboxylic acid ester monomers include methyl esters, ethyl esters, propyl esters, butyl esters, pentyl esters, hexyl esters, heptyl esters, octyl esters, nonyl esters and decyl esters of the α,β-unsaturated carboxylic acids. These may be used singly, or two or more may be used in combination. Examples of the metals and the metal ions used in the ionomers include Na, K, Cu, Mg, Ca, Ba, Zn, Cd, Al, Fe, Co and Ni, and ions thereof. These may be used singly, or two or more may be used in combination. Preferably, at least Zn (also written as "zinc" in the present specification) is included. Of those described above, an ionomer of ethylene-methacrylic acid copolymer is preferable. Examples of commercially available olefin-based ionomers include HIMILAN (registered trademark) series manufactured by DOW-MITSUI POLYCHEMICALS CO., LTD.

The olefin-based ionomer (B) preferably has a melting point of 75 to 100° C., more preferably 80 to 95° C., as measured in accordance with ISO 11357-3 using a differential scanning calorimeter (DSC) in a nitrogen atmosphere at a heat-up rate of 20° C./min.

The density of the olefin-based ionomer (B) measured in accordance with JIS K7112 is preferably 940 to 980 kg/m$^3$, and more preferably 950 to 970 kg/m$^3$.

Further, it is preferable that the metal ion contained in the olefin-based ionomer (B) include at least zinc ion, and it is more preferable that the content of zinc element measured by inductively coupled plasma-optical emission spectrometry ICP-AES be not less than 3 mass %.

The above ranges of melting point, density and zinc content are advantageous from the points of view of the compatibility with the polyamide, and the stability of wall thickness by the reduction of swell during blow molding.

Based on 100 mass % of the polyamide resin composition, the content of the olefin-based ionomer (B) is not less than 15 mass %, preferably 15 to 45 mass %, and more preferably 15 to 35 mass %. By virtue of the olefin-based ionomer (B) representing the above proportion, good low-temperature characteristics and parison characteristics in blow molding are obtained.

(C) Impact Modifiers

The polyamide resin composition preferably includes at least one kind of an impact modifier (C). Examples of the impact modifiers include rubbery polymers. The impact modifiers preferably have a flexural modulus of not more than 500 MPa as measured in accordance with ASTM D-790.

Specific examples of the impact modifiers (C) include (ethylene and/or propylene)/α-olefin-based copolymers, and (ethylene and/or propylene)/(α,β-unsaturated carboxylic acid and/or unsaturated carboxylic acid ester)-based copolymers. These may be used singly, or two or more may be used in combination. A preferred impact modifier (C) is an ethylene/α-olefin-based copolymer.

The (ethylene and/or propylene)/α-olefin-based copolymers are polymers obtained by copolymerizing ethylene and/or propylene with an α-olefin having 3 or more carbon atoms or 4 or more carbon atoms.

Examples of the α-olefins having 3 or more carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene. These may be used singly, or two or more may be used in combination.

Further, the copolymers may involve polyenes such as non-conjugated dienes. Examples of the non-conjugated dienes include 1,4-pentadiene, 1,4-hexadiene, 1,5-hexadiene, 1,4-octadiene, 1,5-octadiene, 1,6-octadiene, 1,7-octadiene, 2-methyl-L5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, cyclooctadiene, 5-vinylnorbornene, 5-ethylidene-2-norbornene, 5-methylene-2-norbornene, 5-isopropyridene-2-norbornene, 6-chloromethyl-5-isopropylidene-2-norbornene, 2,3-diisopropylidene-5-norbornene, 2-ethylidene-3-isopropylidene- 5-norbornene and 2-propenyl-2,5-norbornadiene. These may be used singly, or two or more may be used in combination.

The (ethylene and/or propylene)/(α,β-unsaturated carboxylic acid and/or unsaturated carboxylic acid ester)-based copolymers are polymers obtained by copolymerizing ethylene and/or propylene with an α,β-unsaturated carboxylic acid monomer and/or an α,β-unsaturated carboxylic acid ester monomer. Examples of the α,β-unsaturated carboxylic acid monomers include acrylic acid and methacrylic acid. Examples of the α,β-unsaturated carboxylic acid ester monomers include methyl esters, ethyl esters, propyl esters, butyl esters, pentyl esters, hexyl esters, heptyl esters, octyl esters, nonyl esters and decyl esters of the α,β-unsaturated carboxylic acids. These may be used singly, or two or more may be used in combination.

Further, the (ethylene and/or propylene)/α-olefin-based copolymers and the (ethylene and/or propylene)/(α,β-unsaturated carboxylic acid and/or unsaturated carboxylic acid ester)-based copolymers used as the impact modifiers (C) may be polymers modified with a carboxylic acid and/or a derivative thereof. The modification with such a component introduces into the molecule a functional group having affinity for the polyamide resin (A).

Examples of the functional groups having affinity for the polyamide resins (A) include carboxyl groups, acid anhydride groups, carboxylic acid ester groups, carboxylic acid metal salts, carboxylic imide groups, carboxylic amide groups and epoxy groups.

Examples of the compounds containing these functional groups, namely, the carboxylic acids and derivatives thereof include acrylic acid, methacrylic acid, maleic acid, fumaric acid, itaconic acid, crotonic acid, mesaconic acid, citraconic acid, glutaconic acid, cis-4-cyclohexene-1,2-dicarboxylic acid, endobicyclo-[2.2.1]-5-heptene-2,3-dicarboxylic acid, metal salts of these carboxylic acids, monomethyl maleate, monomethyl itaconate, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl maleate, dimethyl itaconate, maleic anhydride, itaconic anhydride, citraconic anhydride, endobicyclo-[2.2.1]-5-heptene-2,3-dicarboxylic anhydride, maleimide, N-ethylmaleimide, N-butylmaleimide, N-phenylmaleimide, acrylamide, methacrylamide, glycidyl acrylate, glycidyl methacrylate, glycidyl ethacrylate, glycidyl itaconate and glycidyl citraconate. These may be used singly, or two or more may be used in combination. Among those described above, maleic anhydride is preferable.

In particular, the (ethylene and/or propylene)/α-olefin-based copolymers and the (ethylene and/or propylene)/(α,β-unsaturated carboxylic acid and/or unsaturated carboxylic acid ester)-based copolymers used as the impact modifiers (C) are preferably polymers which are modified with an acid such as an unsaturated carboxylic acid or an acid anhydride thereof.

When the impact modifier (C) contains an acid anhydride group, the content of the acid anhydride groups in the impact modifier (C) is preferably more than 25 μmol/g and less than 100 μmol/g, more preferably not less than 35 μmol/g and less than 95=mol/g, and still more preferably not less than 40 μmol/g and not more than 90 μmol/g. When the content is more than 25 μmol/g, the composition that is obtained exhibits a high melt viscosity and can attain a target wall thickness dimension when being blow molded. When the content is less than 100 μmol/g, the composition has a melt viscosity that is not excessively high and can be molded favorably with less load on the extruder. The content of the acid anhydride groups in the impact modifier (C) is measured by neutralization titration of a sample solution prepared with toluene and ethanol, against 0.1 N KOH ethanol solution using phenolphthalein as an indicator.

In the case where two or more kinds of the impact modifiers (C) having different contents of acid anhydride groups are used, the content of acid anhydride groups in the whole of the impact modifiers (C) is preferably measured by neutralization titration of a sample solution prepared with toluene and ethanol, against 0.1 N KOH ethanol solution using phenolphthalein as an indicator. When, however, the contents of acid anhydride groups and mixing ratios of the respective impact modifiers are known, the content of acid anhydride groups in the impact modifiers (C) may be determined by multiplying each of the contents of acid anhydride groups by the mixing ratio and combining the products to give the average value.

In the impact modifier (C), the MFR measured in accordance with ASTM D1238 at a temperature of 230° C. under a load of 2160 g is preferably not less than 0.1 g/10 min and not more than 10.0 g/10 min. When the MFR is 0.1 g/10 min or more, the polyamide resin composition exhibits a melt viscosity that is not excessively high, and can be molded, for example, extruded, while ensuring that the shape of the extrudate or the shape of the parison will not be destabilized, with the result that the molded article tends to attain a more uniform thickness. When the MFR is 10.0 g/10 min or less, an molded article by extrusion molding or a parison for blow molding will have a minor drawdown, and a satisfactory extrusion molded article or a blow molded article tends to be obtained.

Based on 100 mass % of the polyamide resin composition, the content of the impact modifier (C) is 0 to 10 mass %, and preferably 2 to 10 mass %. This content of the impact modifier (C) ensures that good low-temperature properties will be obtained, and blow molded articles will have a uniform wall thickness.

(D) Heat Resistant Agents

The polyamide resin composition includes heat resistant agents (D). The heat resistant agents (D) include two or more kinds of organic hindered phenol heat resistant agents (D-1). The inclusion of two or more kinds of organic hindered phenol heat resistant agents (D-1) ensures that even when the molten resin accumulates in a molding machine for a long residence time, thermal weldability will be further enhanced without deterioration in usual properties such as thermal aging properties, melt viscosity and other properties. For example, the reason for this effect is probably because the addition of organic hindered phenol heat resistant agents suppresses gelation from thermal deterioration of the impact modifier and thereby suppresses a nucleation action. Thus, the incorporation of two or more kinds of organic hindered phenol heat resistant agents results in excellent blow moldability and can prevent the occurrence of burn marks in blow molding. The heat resistant agents preferably further include a phosphorus heat resistant agent (D-2) in addition to the two or more kinds of organic hindered phenol heat resistant agents. The organic hindered phenol heat resistant agents do not include phosphorus heat resistant agents having a hindered phenol structure and inorganic heat resistant agents having a hindered phenol structure.

(Hindered Phenol Heat Resistant Agents)

In the present specification, hindered phenol refers to a compound having a substituent at an O (ortho) position relative to the hydroxyl group of phenol. The ortho substituents are not particularly limited, and examples thereof include alkyl groups, alkoxy groups, amino groups and halogens. Among these, alkyl groups such as methyl group, ethyl group, n-propyl group, i-propyl group, n-butyl group, sec-butyl group, i-butyl group and t-butyl group are preferable. Bulky groups such as i-propyl group, sec-butyl group, i-butyl group and t-butyl group are more preferable, with t-butyl group being most preferable. Preferably, both of the two 0-positions relative to the hydroxyl group of phenol are substituted.

(Organic Hindered Phenol Heat Resistant Agents (D-1))

Examples of the organic hindered phenol heat resistant agents include organic hindered phenol heat resistant agents (D-1-1) having an amide bond in the molecule, and organic hindered phenol heat resistant agents (D-1-2) having no amide bonds in the molecule. Some preferred combinations of two or more kinds of these organic hindered phenol heat resistant agents include a combination of one or more kinds of organic hindered phenol heat resistant agents (D-1-1) having an amide bond in the molecule, and one or more kinds of organic hindered phenol heat resistant agents (D-1-2) having no amide bonds in the molecule, and a combination of two or more kinds of organic hindered phenol heat resistant agents (D-1-2) having no amide bonds in the molecule.

(Organic Hindered Phenol Heat Resistant Agents (D-1-1) Having Amide Bond in Molecule)

Specific examples of the organic hindered phenol heat resistant agents (D-1-1) having an amide bond in the molecule include N,N'-hexamethylenebis(3,5-di-t-butyl-4-hydroxy-hydrocinnamamide. Single, or two or more kinds of such heat resistant agents may be used. Examples of commercially available products of this type include heat resistant agent sold under the product name "Irganox 1098" (BASF).

(Organic Hindered Phenol Heat Resistant Agents (D-1-2) Having No Amide Bonds in Molecule)

Specific examples of the organic hindered phenol heat resistant agents (D-1-2) having no amide bonds in the molecule include pentaerythritol-tetrakis[3-(3,5-di-t-butyl-4-hydroxyphenyl)-propionate, ethylenebis(oxyethylene)bis[3-(5-tert-butyl-4-hydroxy-m-tolyl) propionate] and 3,9-bis[2-β-(3-tert-butyl-4-hydroxy-5-methylphenyl) propionyloxy]-1,1-dimethylethyl]-2,4,8,10-tetraoxaspiro[5.5]undecane. These may be used singly, or two or more may be used in combination. Examples of commercially available products of the heat resistant agents of this type include "Irganox 1010" (BASF) and "Sumilizer GA-80" (Sumitomo Chemical Co., Ltd.).

(Phosphorus Heat Resistant Agents (D-2))

Preferred phosphorus heat resistant agents (D-2) are phosphorous acid ester compounds of hindered phenols, and hypophosphorous acid ester compounds of hindered phenols. More preferred are phosphorous acid ester compounds of hindered phenols having a t-butyl group at an O-position, and hypophosphorous acid ester compounds of hindered phenols having a t-butyl group at an O-position. Phosphorous acid ester compounds of hindered phenols having a t-butyl group at an O-position are still more preferable. Specific examples of the phosphorous acid ester compounds of hindered phenols having a t-butyl group at an O-position include tris(2,4-di-t-butylphenyl) phosphite and bis(2,6-di-t-butyl-4-methylphenyl)pentaerythritol diphosphite. Specific examples of the hypophosphorous acid ester compounds of hindered phenols having a t-butyl group at an O-position include reaction product of biphynyl, phosphorus trichloride and 2,4-di-tert-butylphenol that is principally composed of tetrakis(2,4-di-tert-butylphenoxy)-4,4-biphynyl diphosphine. Examples of commercially available products of the heat resistant agents of this type include "Irgafos 168" (BASF). These may be used singly, or two or more may be used in combination.

The heat resistant agents (D) may include an organic heat resistant agent and an inorganic heat resistant agent other than (D-1) and (D-2). Examples of the organic heat resistant agents other than (D-1) and (D-2) include sulfur antioxidants.

Examples of the sulfur antioxidants include distearyl-3,3-thiodipropionate, pentaerythrityltetrakis(3-laurylthiopropionate) and didodecyl (3,3'-thiodipropionate). These may be used singly, or two or more may be used in combination.

Some example inorganic heat resistant agents other than the heat resistant agents (D-1) and (D-2) are copper compounds and potassium halides. Examples of the copper compounds include cuprous iodide, cuprous bromide, cupric bromide and copper acetate. Cuprous iodide is preferable from the points of view of heat resistance and suppression of metal corrosion. Examples of the potassium halides include potassium iodide, potassium bromide and potassium chloride. Potassium iodide and/or potassium bromide is preferable from the points of view of heat resistance and suppression of metal corrosion. These may be used singly, or two or more may be used in combination.

Further, it is more effective to use in combination a nitrogen-containing compound such as melamine, benzoguanamine, dimethylolurea or cyanuric acid.

Based on 100 mass % of the polyamide resin composition, the content of the heat resistant agents (D) is 0.1 to 3 mass %, and preferably 0.1 to 2 mass %. This content of the heat resistant agents (D) ensures that molded articles can be produced with good appearance without the occurrence of burn marks, nonuniform wall thickness visible on the inner surface, and yellowing over the entirety of the molded articles.

Based on 100 mass % of the polyamide resin composition, the content of the organic hindered phenol heat resistant agent (D-1) is preferably 0.1 to 2 mass %, and more preferably 0.1 to 1.5 mass % from the points of view of heat resistance and the appearance of molded articles, and the content of the phosphorus heat resistant agent (D-2) is preferably 0.1 to 1 mass %, and more preferably 0.1 to 0.5 mass % from the points of view of heat resistance and the appearance of molded articles.

(E) Additives

Depending on purposes or other factors, the polyamide resin composition may appropriately include additives, for example, functionality-imparting agents such as dyes, pigments, fibrous reinforcing materials, particulate reinforcing materials, plasticizers, antioxidants (excluding the components (D)), foaming agents, weather resistant agents, crystal nucleating agents, crystallization accelerators, mold release agents, lubricants, antistatic agents, flame retardants, flame retardant aids and colorants. To ensure that the advantageous effects of the present invention will be manifested more effectively, the polyamide resin composition preferably contains an antioxidant.

The content of the optional additives (E) is preferably 0.01 to 1 mass %, and more preferably 0.05 to 0.5 mass %.

[Polyamide Resin Composition]

The polyamide resin composition is preferably such that when the resin is extruded into a 15 cm strand at a measurement temperature of 250° C. and a shear rate of 121.6 sec$^{-1}$ in accordance with ISO 11443 using a capillary rheometer having a capillary die 1.0 mm in inner diameter and 10 mm in length, the strand being then sampled and solidified by cooling at room temperature for 24 hours, the diameter of the strand measured with a caliper is less than 3.00 mm, and more preferably 2.50 mm or less. The polyamide resin composition satisfying this strand diameter is advantageous in that the swell in blow molding can be reduced and a molded article with a target dimension can be easily obtained. The above value may be achieved by using an olefin-based ionomer (B) which has a melting point of 80 to 95° C. and a density of 950 to 970 kg/m$^3$, and which includes metal ions including at least zinc ion and has a content of zinc element of not less than 3 mass % as measured by inductively coupled plasma-optical emission spectrometry ICP-AES.

The polyamide resin composition may be produced by any method without limitation. For example, the following methods may be adopted.

The polyamide resin (A), the olefin-based ionomer (B) and other optional components may be mixed together using a commonly known melt kneading device such as a single-screw or twin-screw extruder, a Banbury mixer, a kneader or a mixing roll. For example, all the ingredients may be mixed together and then melt kneaded using a twin-screw extruder. Alternatively, some of the ingredients may be mixed together and then melt kneaded, and further the rest of the ingredients may be added and melt kneaded. Still alternatively, some of the ingredients may be mixed together and then melt kneaded while mixing the rest of the ingredients using a side feeder. Any of these and other methods may be adopted.

The polyamide resin composition is capable of keeping a parison shape in spite of having a low melt viscosity, and can give a molded article with excellent surface appearance even when the composition has accumulated during the molding process. Thus, the polyamide resin composition may be suitably used for the production of blow molded articles by blow molding. Further, the polyamide resin composition may be suitably used for the production of extrusion molded articles by extrusion molding.

The polyamide resin may be blow molded into a blow molded article by any known method without limitation. Generally, the polyamide resin composition may be formed into a parison and then blow molded using a usual blow molding machine. A parison is preferably formed at a resin temperature which is 10° C. to 70° C. higher than the melting point of the polyamide resin composition.

The polyamide resin may be extruded into an extruded article by any known method without limitation.

The composition may be co-extruded together with a polyolefin such as polyethylene or other thermoplastic resin and then may be blow molded into a multilayer structure. In this case, an adhesive layer may be interposed between the polyamide resin composition layer and the layer of a polyolefin or other thermoplastic resin. In such a multilayer structure, the polyamide resin composition of the present invention may be used for any of the outer layer and the inner layer.

The polyamide resin composition may be used as blow molded articles by blow molding and extrusion molded articles by extrusion in numerous applications without limitation. Some preferred articles are automobile parts such as spoilers, air intake ducts, intake manifolds, resonators, fuel tanks, gas tanks, hydraulic oil tanks, fuel filler tubes, fuel delivery pipes, and other various hoses, tubes and tanks; power tool housings; machinery parts such as pipes; electric/electronic parts; household/office supplies; building material-related parts; and furniture parts. Among these molded articles, large tanks, especially high-pressure gas tanks, are more preferred applications in view of the fact that the polyamide resin composition of the present invention have high suitability for blow molding that is applicable to the molding of large articles and are also excellent in impact resistance.

EXAMPLES

Hereinbelow, the present invention will be described in more detail based on Examples and Comparative Examples. However, it should be construed that the scope of the present invention is not limited to such Examples. In Examples and Comparative Examples, properties of resins and molded articles were evaluated using the following methods.

(Productivity)

Various productivity indexes were checked by performing melt-kneading with twin-screw kneader TEX44HCT having a cylinder diameter of 44 mm and L/D of 35, at a cylinder temperature of 250° C., a screw rotational speed of 120 rpm, and a discharge of 40 kg/hrs.

(1) Resin Temperature

The temperature of the resin in the kneader was measured near the die head before the strand was discharged. An excessively high resin temperature can cause deterioration in quality.

(2) Torque (Electric Current)

The screw current value during kneading was measured to simulate the torque. The lower the current value, the more the screw rotational speed can be increased and the higher the productivity.

(3) Conditions of Strands

The strand conditions were evaluated as good when the surface was smooth without any irregularities, and were evaluated as poor when the surface was irregular or markedly rough.

From the results of the above productivity indexes (1) to (3), the productivity was evaluated based on the following criteria.

◯: The resin composition satisfied all requirements of 335° C. or lower resin temperature, 134 A or lower torque and good strand conditions.

x: The productivity was judged as x when the resin composition failed to satisfy any one or more of the requirements under the same criteria as ◯.

(Blow Moldability)

Blow moldability was evaluated using accumulator head blow molding machine DA-50 manufactured by PLACO Co., Ltd. Molded articles were obtained under measurement conditions where the cylinder temperature was 250° C., the screw rotational speed was 40 rpm, the die diameter was 50 mm, and the mold was a cylindrical 3-liter bottle mold.

(1) Extrudability

The current value during rotation of the screw was measured as an index of extrudability. The lower the current value, the higher the extrudability, the more the screw rotational speed can be increased, and the shorter the blow molding cycle.

(2) Parison Characteristics (2-1) Amount of Droop in 5 Seconds (Amount of Drawdown in 5 Seconds after Injection)

A parison was injected from the accumulator and was video-recorded. The length of the resin droop after the lapse of 5 seconds was read on the video. The smaller the amount of droop in 5 seconds, the higher the parison shape retention.

(2-2) Amount of Droop in 2 Seconds (Amount of Drawdown in 2 Seconds after Injection)

The amount of droop in 2 seconds was read on the video in the same manner as the amount of droop in 5 seconds was measured. The smaller the amount of droop in 2 seconds, the higher the parison shape retention.

(3) Conditions of Inner Surface

Blow molded articles were visually evaluated as good when there were no burn marks on all the inner and outer surfaces and the entirety of the molded article was free from yellowing.

(4) Irregularities on Inner Surface Caused by Accumulation

To evaluate the uniformity in wall thickness, the inner surface of a blow molded article produced after accumulation in the apparatus was visually inspected for irregularities and was evaluated based on the following criteria. The less the irregularities, the higher the uniformity in wall thickness.

Absent: The inner surface was free from large irregularities and was uniform and similar in conditions to the outer surface.

Present: The inner surface had large irregularities and was not the same in conditions as the outer surface.

From the results of the above blow moldability indexes (1) to (4), the blow moldability was evaluated based on the following criteria.

◯: The blow moldability was judged as ◯ when all the following requirements were satisfied. As an index of extrudability, the current value was less than 40 A. The amount of droop in 5 seconds or the amount of droop in 2 seconds was less than 50 cm. The blow molded article had no burn marks on all the inner and outer surfaces and was free from yellowing over the entirety of the molded article, or the blow molded article had burn marks on the inner surface only in some areas at the blown-in portion and the pinched-off portion. There were no irregularities on the inner surface caused by accumulation.

x: The blow moldability was judged as x when any one or more of the requirements were not satisfied under the same criteria as ◯.

(Properties at 23° C. and Properties at –60° C.)

Type-A or type-B test pieces according to ISO standards were fabricated by injection molding and were tested to obtain data of mechanical properties.

(1) Tensile Stress at Yield and Nominal Tensile Strain at Yield, and Nominal Tensile Strain at Break and Tensile Strength Measurement was performed at 23° C. and –60° C. in accordance with ISO 527-2/1A/50 using an Instron tensile tester, model 5567.

(2) Tensile Modulus

Measurement was performed at 23° C. in accordance with ISO 527-2/1A/1 using an Instron tensile tester, model 5567.

(3) Charpy Impact Strength

In accordance with ISO 179-1/1eA, 4 mm thick test pieces (n=10) having a notch shape A were tested by an edgewise impact test at –40° C. using Charpy impact tester No. 258-PC manufactured by YASUDA SEIKI SEISAKUSHO, LTD.

From the results of the properties (1) and (2) at 23° C. and –60° C., the properties at 23° C. and at –60° C. were evaluated based on the following criteria.

◯: The test pieces satisfied all of 100% or more nominal tensile strain at break at 23° C., more than 17% nominal tensile strain at break at –60° C. and 1500 MPa or more tensile modulus at 23° C.

x: The properties were judged as x when the test pieces failed to satisfy any one or more of the requirements under the same criteria as ◯.

(Quality)

(1) Melt Viscosity

The melt viscosity was measured in accordance with ISO 11443 using Capilograph 1D, model P-C, manufactured by Toyo Seiki Seisaku-sho, Ltd. The measurement temperature was 250° C., and the orifice used was 1.0 mm in hole diameter and 10 mm in length (L/D=10). The melt viscosity was measured at each of the shear rates of 12.16 sec$^{-1}$, 60.8 sec$^{-1}$ and 121.6 sec$^{-1}$. Excessively high melt viscosity increases the load on the kneader and the blow molding machine and causes a limitation on discharge, thus being not preferable in terms of productivity.

(2) Strand Diameter

Similarly to the measurement of melt viscosity, the resin was extruded at a measurement temperature of 250° C. and each of the shear rates of 12.16 sec$^{-1}$, 60.8 sec$^{-1}$ and 121.6 sec$^{-1}$, using a capillary die 1.0 mm in inner diameter and 10 mm in length. The strand that had been extruded 15 cm was sampled and solidified by cooling at room temperature for 24 hours. The diameter of the central portion was measured with a caliper to determine the strand diameter. An excessive increase in strand diameter is undesirable for the reason that a swell cannot be controlled during blow molding and a molded article will be out of a target size.

(3) Measurement of Melting Point Tm and Crystallization Temperature Tc

Measurement was performed in a nitrogen atmosphere in accordance with ISO 11357-3 at a heat-up rate of 20° C./min using PYRIS Diamond DSC manufactured by PerkinElmer Co., Ltd.

(4) Heat Resistance

Type-A test pieces according to ISO standards were fabricated by injection molding and were tested to obtain data of heat resistance. The test pieces were heat treated in a hot air oven preset to 200° C., and were taken out 4.5 hours later. After being cooled, the test pieces were tested in accordance with ISO 527-2/1A/50 using Instron tensile tester, model 5567, at –60° C. to determine the tensile stress at yield and the tensile strain at break.

(5) Blister Resistance

A 4 mm thick blow molded article was placed into an autoclave filled with high-pressure hydrogen gas at 87.5 MPa and 85° C., and was held therein for more than 20 hours. The autoclave was decompressed in 0.5 min, and the molded article was taken out. The test piece was visually inspected for the presence or absence of blister-like appearance abnormality.

From the results of the above quality tests (1) to (5), the quality was evaluated based on the following criteria.

◯: The quality was judged as ◯ when all the following requirements were satisfied. The melt viscosity at a shear rate of 12.16 sec$^1$ was less than 15,000. The strand diameter at a shear rate of 121.6 sec$^{-1}$ was less than 2.7 mm. The difference between the melting point Tm and the crystallization temperature Tc was more than 45° C. The heat resistance satisfied more than 15% tensile strain at break in the tensile test at –60° C. after treatment at 200° C. for 4.5 hours. No blisters were found in the blister resistance test.

x: The quality was judged as x when any one or more of the requirements were not satisfied under the same criteria as ◯.

Examples 1 to 14 and Comparative Examples 1 to 11

Target polyamide resin composition were prepared as pellets by melt kneading the components shown in Table 1 using twin-screw kneader TEX44HCT having a cylinder diameter of 44 mm and L/D of 35, at a cylinder temperature of 250° C., a screw rotational speed of 120 rpm, and a discharge of 40 kg/hrs.

The unit for the composition in the table is mass % relative to the whole resin composition taken as 100 mass %.

The pellets obtained were used for the evaluation of the properties described above. The results obtained are described in Table 1.

The abbreviations in the table are as follows.
(Polyamide Resins)

PA6: Polyamide 6, product name "1030B" manufactured by UBE INDUSTRIES, LTD.

PA6/66: Polyamide 6/66, product name "5034B" manufactured by UBE INDUSTRIES, LTD.

Aromatic PA6T/6I: Polyamide 6T/6I, product name "Grivory G21" manufactured by EMS-CHEMIE (Japan) Ltd.

(Olefin-Based Ionomers)

Ionomer-1: Density: 960 kg/m$^3$, melting point: 88° C., melt flow rate: 0.9 g/10 min, zinc content: 3.4 mass %, ethylene-methacrylic acid copolymer, metal ion: zinc, product name "HIMILAN (registered trademark) 1706" manufactured by DOW-MITSUI POLYCHEMICALS CO., LTD.

Ionomer-2: Density: 950 kg/m$^3$, melting point: 96° C., melt flow rate: 1.0 g/10 min, zinc content: 2.9 mass %, ethylene-methacrylic acid copolymer, metal ion: zinc, product name "HIMILAN (registered trademark) AM7328T" manufactured by DOW-MITSUI POLYCHEMICALS CO., LTD.

Ionomer-3: Density: 960 kg/m$^3$, melting point: 95° C., melt flow rate: 1.0 g/10 min, zinc content: 2.9 mass %, ethylene-methacrylic acid copolymer, metal ion: zinc, product name "HIMILAN (registered trademark) 1554W" manufactured by DOW-MITSUI POLYCHEMICALS CO., LTD.

Ionomer-4: Density: 950 kg/m$^3$, melting point: 101° C., melt flow rate: 1.1 g/10 min, zinc content: 1.6 mass %, ethylene-methacrylic acid copolymer, metal ion: zinc, product name "HIMILAN (registered trademark) AM7326" manufactured by DOW-MITSUI POLYCHEMICALS CO., LTD.

(Impact Modifiers)

m-EBR: Maleic anhydride-modified ethylene-butene copolymer, product name "TAFMER (registered trademark) MH5020" manufactured by Mitsui Chemicals, Inc.

m-LLDPE: Maleic anhydride-modified linear low-density polyethylene, product name "UBE BOND F3000" manufactured by UBE-MARUZEN POLYETHYLENE.

(Heat Resistant Agents)

Heat resistant agent 1: Phenolic antioxidant (N,N'-hexamethylenebis(3,5-di-t-butyl-4-hydroxy-hydrocinnamide), product name "Irganox 1098" manufactured by BASF.

Heat resistant agent 2: Phenolic antioxidant (3,9-bis[2-[3-(3-tert-butyl-4-hydroxy-5-methylphenyl)propionyloxy]-1,1-dimethylethyl]-2,4,8,10-tetraoxaspiro[5.5]undecane), product name "Sumilizer GA-80" manufactured by Sumitomo Chemical Co., Ltd.

Heat resistant agent 3: Phosphorus antioxidant (tris(2,4-di-t-butylphenyl) phosphite), product name "Irgafos 168" manufactured by BASF.

Heat resistant agent 4: Phenolic antioxidant (pentaerythritoltetrakis[3-(3,5-di-tert-butyl-4-hydroxyphenyl) propionate]), product name "Irganox 1010" manufactured by BASF.

(Dispersant)

Dispersant: Nonionic activator, product name "Value-7220" manufactured by Marubishi Oil Chemical Corporation.

TABLE 1

| | | Units | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 | Comparative Example 13 |
|---|---|---|---|---|---|---|---|---|---|---|---|---|---|---|---|
| Formulation | Compound formulation | | | | | | | | | | | | | | |
| | PA6 1030B | mass % | 53.8 | 48.8 | 38.8 | 48.8 | 48.8 | 48.8 | 48.8 | 49.3 | 48.8 | 58.8 | 49.0 | 48.8 | 48.8 |
| | PA6/66 5034B | mass % | 20.0 | 20.0 | 20.0 | 20.0 | 20.0 | 20.0 | 20.0 | 20.0 | 20.0 | 20.0 | 20.0 | 20.0 | 20.0 |
| | Aromatic PA 6I/6I Grivory G21 | mass % | 5.0 | 5.0 | 5.0 | 5.0 | 5.0 | 5.0 | 5.0 | 5.0 | 5.0 | 5.0 | 5.0 | 5.0 | 5.0 |
| | Ionomer-1 Himilan 1706 | mass % | 20.0 | 25.0 | 35.0 | 22.5 | 20.0 | 17.5 | 15.0 | 25.0 | 25.0 | 15.0 | 25.0 | | |
| | Ionomer-2 Himilan AM7328T | mass % | | | | | | | | | | | | 25.0 | |
| | Ionomer-3 Himilan 1554W | mass % | | | | | | | | | | | | | 25.0 |
| | Ionomer-4 Himilan AM7326 | mass % | | | | | | | | | | | | | |
| | m-EBR Tafmer MH5020 | mass % | | | | 2.5 | 5.0 | 7.5 | 10.0 | | | | | | |
| | m-LLDPE F3000 | mass % | | | | | | | | | | | | | |
| | Heat resistant agent 1 Irganox 1098 | mass % | 0.50 | 0.50 | 0.50 | 0.50 | 0.50 | 0.50 | 0.50 | | | 0.50 | | 0.50 | 0.50 |
| | Heat resistant agent 2 Sumilizer GA-80 | mass % | | | | | | | | 0.50 | 0.50 | | | | |
| | Heat resistant agent 3 Irgafos168 | mass % | 0.25 | 0.25 | 0.25 | 0.25 | 0.25 | 0.25 | 0.25 | 0.25 | 0.25 | 0.25 | | | 0.25 |
| | Heat resistant agent 3 Value-7220 | mass % | 0.50 | 0.50 | 0.50 | 0.50 | 0.50 | 0.50 | 0.50 | 0.50 | 1.00 | 0.50 | 0.50 | 0.50 | 0.50 |
| | Dispersant Value-7220 | mass % | 0.10 | 0.10 | 0.10 | 0.10 | 0.10 | 0.10 | 0.10 | 0.10 | 0.10 | 0.10 | 0.10 | 0.10 | 0.10 |
| Productivity | Compounding status TEX44HCT Resin temperature | ° C. | 314 | 315 | 305 | 319 | 325 | 318 | 334 | 315 | 315 | 314 | 315 | 306 | 308 |
| | Torque (electric current) | Amp | 119 | 118 | 114 | 120 | 122 | 125 | 130 | 117 | 117 | 118 | 118 | 113 | 115 |

TABLE 1-continued

| | | | | | | | | | | | | | | | |
|---|---|---|---|---|---|---|---|---|---|---|---|---|---|---|---|
| Shaping properties | Discharge of 40 kg/hrs Rotational speed 120 rpm | | | Good | Good | Good | Good | Good | Good | Good | Good | Good | Good | Good | Good | Good |
| | Strand conditions | | | ○ | ○ | ○ | ○ | ○ | ○ | ○ | ○ | ○ | ○ | ○ | ○ | ○ |
| | Judge Blow moldability | | | | | | | | | | | | | | | |
| | Extrudability Screw rotation | Extruder torque (rated ampere: 56 A) | A | 30 | 37 | 33 | 35 | 37 | 39 | 39 | 36 | 34 | 32 | 37 | 32 | 31 |
| | Parison characteristics | Drawdown in 5 sec after injection | cm | 30 | 5 | 5 | 10 | 5 | 5 | 15 | 5 | 5 | >50 | 20 | >50 and fell | >50 and fell |
| | 1 m retention | Drawdown in 2 sec after injection | cm | 10 | 5 | 0 | 5 | 5 | 5 | 5 | 5 | 5 | 35 | 5 | 5 | 5 |
| | Other molding defects | | — | | | | | | | | | | | | | |
| | Molded article quality | Inner surface conditions | — | Good | Good | Good | Good | Good | Good | Good | Good | Good | Good | Local burn marks at pinched-off portion Absent | Good | Good |
| | | Irregularities on inner surface by accumulation | — | Absent | Absent | Absent | Absent | Absent | Absent | Absent | Absent | Absent | Absent | Absent | Absent | Absent |
| | Judge | | | ○ | ○ | ○ | ○ | ○ | ○ | ○ | ○ | ○ | ○ | ○ | ○ | ○ |
| Quality (properties) | Properties at 23° C. | Tensile stress at yield | ISO 527-2/1A/50 MPa | 58 | 54 | 42 | 55 | 52 | 50 | 48 | 54 | 52 | 62 | 55 | 57 | 56 |
| | | Nominal tensile strain at yield | ISO 527-2/1A/50 % | 5 | 5 | 6 | 4 | 5 | 5 | 5 | 5 | 5 | 5 | 5 | 4 | 4 |
| | | Nominal tensile strain at break | ISO 527-2/1A/50 % | 140 | 220 | 235 | 183 | 175 | 200 | 157 | 220 | 240 | 132 | 160 | 234 | 217 |
| | | Tensile strength | ISO527-2/1A/50 MPa | 64 | 66 | 66 | 65 | 62 | 61 | 58 | 65 | 63 | 62 | 55 | 72 | 71 |
| | | Tensile modulus | ISO527-2/1A/1 MPa | 2,100 | 2,019 | 1,553 | 1,861 | 1,806 | 1,810 | 1,671 | 2,050 | 2,000 | 2,251 | 2,100 | 1,935 | 1,943 |

TABLE 1-continued

| | | | | 29 | 33 | 56 | 35 | 42 | 51 | 88 | 32 | 30 | 24 | 30 | 27 | 29 |
|---|---|---|---|---|---|---|---|---|---|---|---|---|---|---|---|---|
| Quality (low temperature) | Charpy notched impact strength at −40°C | ISO179-1/1eA | kJ/m² | | | | | | | | | | | | | |
| | Extremely cold tensile properties at −60°C | | | | | | | | | | | | | | | |
| | Tensile stress at yield | ISO 527-2/1A/50 | MPa | 110 | 108 | 97 | 101 | 98 | 95 | 92 | 107 | 105 | 113 | 109 | 103 | 103 |
| | Nominal tensile strain at yield | ISO 527-2/1A/50 | % | 11 | 11 | 15 | 11 | 11 | 11 | 11 | 11 | 10 | 10 | 10 | 10 | 10 |
| | Nominal tensile strain at break | ISO 527-2/1A/50 | % | 23 | 25 | 34 | 27 | 23 | 25 | 25 | 27 | 25 | 19 | 22 | 24 | 21 |
| | Tensile strength | ISO527-2/1A/50 | MPa | 110 | 108 | 97 | 101 | 98 | 95 | 92 | 107 | 105 | 113 | 109 | 103 | 103 |
| | Judge | | | ○ | ○ | ○ | ○ | ○ | ○ | ○ | ○ | ○ | ○ | ○ | ○ | ○ |
| Quality (other properties) | Fluidity, thermal characteristics, heat resistance | | | | | | | | | | | | | | | |
| | Melt viscosity Capilograph L/D10, 250°C, 0.02 or less water content | 12.16 sec⁻¹ | Pa·s | 4,710 | 5,517 | 6,597 | 6,580 | 7,550 | 8,655 | 9,720 | 5,680 | 5,396 | 4,892 | 5,230 | 3,393 | 3,440 |
| | | 60.8 sec⁻¹ | Pa·s | 2,600 | 3,000 | 3,345 | 3,370 | 3,654 | 4,062 | 4,460 | 3,090 | 2,936 | 2,638 | 2,920 | 2,012 | 1,949 |
| | | 121.6 sec⁻¹ | Pa·s | 1,943 | 2,132 | 2,329 | 2,370 | 2,578 | 2,789 | 3,075 | 2,195 | 2,085 | 2,004 | 2,010 | 1,477 | 1,416 |
| | Strand diameter | 12.16 sec⁻¹ | mm | 1.55 | 1.60 | 1.70 | 1.60 | 1.55 | 1.50 | 1.50 | 1.60 | 1.60 | | | 1.60 | 1.60 |
| | | 60.8 sec⁻¹ | mm | 2.40 | 2.45 | 2.55 | 2.35 | 2.30 | 2.20 | 2.10 | 2.45 | 2.45 | | | 2.65 | 2.70 |
| | | 121.6 sec⁻¹ | mm | 2.50 | 2.55 | 2.65 | 2.45 | 2.35 | 2.30 | 2.20 | 2.55 | 2.55 | | | 3.00 | 3.05 |
| | Thermal characteristics | | | | | | | | | | | | | | | |
| | Melting point (DSC Tm-2nd) | ISO 11357-3 | °C | 217 | 217 | 215 | 215 | 215 | 216 | 215 | 217 | 216 | 217 | 217 | 217 | 217 |
| | Solidifying point | ISO 11357-3 | °C | 162 | 161 | 155 | 165 | 164 | 164 | 165 | 160 | 163 | 165 | 168 | 168 | 167 |
| | Melting point - Solidifying point | | °C | 55 | 55 | 61 | 50 | 51 | 51 | 50 | 57 | 53 | 52 | 49 | 49 | 50 |
| | Heat resistance | Tensile stress at yield | MPa | | 107 | | | | 97 | | | | | 108 | | |

TABLE 1-continued

| | Units | Comparative Example 14 | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|---|---|
| Tensile stress at break, Tensile tested at −60° C. after heat treated at 200° C. for 4.5 hrs | % | | 31 | | | | 30 | | | 8 | | | |
| Blister resistance 87.5 MPa H₂ gas, presoaked for more than 20 h, evacuated in 0.5 min, one cycle | | Absent (Blow) | Absent (Blow) | Absent (Blow) | Absent (Blow) | Absent (Blow) | Absent (Blow) | Absent (Blow) | Absent (Blow) | Absent (Blow) | Absent (Blow) | Absent (Blow) | Absent (Blow) |
| Molding method in parentheses Judge | | ○ | ○ | ○ | ○ | ○ | ○ | ○ | ○ | ○ | × | × | × |
| Formulation — Compound formulation | | | | | | | | | | | | | |
| PA6 1030B | mass % | 48.8 | 73.8 | 48.8 | 49.3 | 58.8 | 53.8 | 48.8 | 58.8 | 53.8 | 48.8 | 48.8 | 73.8 |
| PA6/66 5034B | mass % | 20.0 | 20.0 | 20.0 | 20.0 | 20.0 | 20.0 | 20.0 | 20.0 | 20.0 | 20.0 | 20.0 | |
| Aromatic PA 6T/6I Grivory G21 | mass % | 5.0 | 5.0 | 5.0 | 5.0 | 5.0 | 5.0 | 5.0 | 5.0 | 5.0 | 5.0 | 5.0 | |
| Ionomer-1 Himilan 1706 | mass % | | | 25.0 | 25.0 | | | | | | | 7.5 | 25.0 |
| Ionomer-2 Himilan AM7328T | mass % | | | | | | | | | | | | |
| Ionomer-3 Himilan 1554W | mass % | | | | | | | | | | | | |
| Ionomer-4 Himilan AM7326 | mass % | 25.0 | | | | | | | | | | | |
| m-EBR Tafmer MH5020 | mass % | | | | | 15.0 | 20.0 | 25.0 | 15.0 | 20.0 | 25.0 | 17.5 | |
| m-LLDPE F3000 | mass % | 0.50 | 0.50 | 1.00 | | 0.50 | 0.50 | 0.50 | 0.50 | 0.50 | 0.50 | 0.50 | 0.50 |
| Heat resistant agent 1 Irganox 1098 | mass % | | | | | | | | | | | | |
| Heat resistant agent 2 Sumilizer GA-80 | mass % | | | | | | | | | | | | |
| Heat resistant agent 3 Irgafos168 | mass % | 0.25 | 0.25 | 0.25 | 0.25 | 0.25 | 0.25 | 0.25 | 0.25 | 0.25 | 0.25 | 0.25 | 0.25 |
| Heat resistant agent 3 Value-7220 | mass % | 0.50 | 0.50 | | | 0.50 | 0.50 | 0.50 | 0.50 | 0.50 | 0.50 | 0.50 | 0.50 |
| Dispersant Value-7220 | mass % | 0.10 | 0.10 | 0.10 | 0.10 | 0.10 | 0.10 | 0.10 | 0.10 | 0.10 | 0.10 | 0.10 | 0.10 |

TABLE 1-continued

| | | | | | | | | | | | | | | | |
|---|---|---|---|---|---|---|---|---|---|---|---|---|---|---|---|
| Productivity | Compounding status TEX44HCT | Resin temperature | °C. | 305 | 319 | 315 | 310 | 329 | 344 | 340 | 338 | 349 | 362 | 340 | 305 |
| | | Torque (electric current) | Amp | 111 | 120 | 118 | 118 | 130 | 135-138 | 130 | 130 | 135 | 140 | 135 | 105 |
| | Discharge of 40 kg/hrs Rotational speed 120 rpm | Strand conditions | | Good | Good | Good | Good | Good | Poor | Poor | Good | Good | Poor | Good | Good |
| Shaping properties | Judge Blow moldability | | | ○ | ○ | ○ | ○ | ○ | x | x | x | x | x | x | ○ |
| | | Extrudability Screw rotation | A | 30 | 35 | 38 | 33 | 36 | 40 | 48 | 40 | 46 | 52 | 53 | 30 |
| | | Parison characteristics Drawdown in 5 sec after injection | cm | >50 and fell | >50 | 10 | 10 | >50 | 35 | 8 | >50 | 45 | 15 | 15 | >50 |
| | | 1 m retention Drawdown in 2 sec after injection | cm | 5 | >50 | 5 | 5 | >50 | 15 | 5 | >50 | 25 | 5 | 5 | >50 |
| | | Other molding defects | | | | Burn marks on inner surface | Burn marks on inner surface | | | | Much smoke | Much smoke | Much smoke | Much smoke | |
| | | Molded article quality Inner surface conditions | | Good | Good | Absent | Absent | Yellowing | Yellowing | Yellowing | Yellowing | Yellowing | Yellowing | Yellowing | Good |
| | | Irregularities on inner surface by accumulation | | Absent | Absent | Absent | Absent | Absent | Present | Present | Absent | Present | Present | Present | Absent |
| | Judge | | | ○ | x | x | x | x | x | x | x | x | x | x | x |
| Quality (properties) | Properties at 23° C. | Tensile stress at yield | ISO 527-2/1A/50 | MPa | 57 | 78 | 54 | 55 | 60 | 54 | 50 | 51 | 45 | 39 | 40 | 59 |
| | | Nominal tensile strain at yield | ISO 527-2/1A/50 | % | 4 | 5 | 5 | 5 | 5 | 5 | 5 | 4 | 4 | 5 | 5 | 5 |
| | | Nominal tensile strain at break | ISO 527-2/1A/50 | % | 233 | 26 | 221 | 220 | 148 | 205 | 156 | 158 | 145 | 159 | 167 | 110 |
| | | Tensile strength | ISO527-2/1A/50 | MPa | 70 | 78 | 67 | 66 | 60 | 62 | 55 | 55 | 50 | 49 | 52 | 59 |
| | | Tensile modulus | ISO527-2/1A/1 | MPa | 1,958 | 2,766 | 2,030 | 2,010 | 2,165 | 1,966 | 1,809 | 1,957 | 1,651 | 1,450 | 1,515 | 2,250 |

TABLE 1-continued

| | | | 20 | 7 | 34 | 34 | 18 | 18 | 19 | 32 | 76 | 100 | 105 | 28 |
|---|---|---|---|---|---|---|---|---|---|---|---|---|---|---|
| Quality (low temperature) | Charpy notched impact strength at −40° C. | ISO179-1/1eA kJ/m² | | | | | | | | | | | | |
| | Extremely cold tensile properties at −60° C. | | | | | | | | | | | | | |
| | Tensile stress at yield | ISO 527-2/1A/50 MPa | 103 | 129 | 109 | 108 | 107 | 101 | 96 | 95 | 87 | 80 | 85 | 112 |
| | Nominal tensile strain at yield | ISO 527-2/1A/50 % | 9 | 9 | 11 | 11 | 9 | 9 | 9 | 10 | 11 | 11 | 11 | 10 |
| | Nominal tensile strain at break | ISO 527-2/1A/50 % | 25 | 13 | 23 | 24 | 16 | 16 | 18 | 20 | 23 | 27 | 27 | 18 |
| | Tensile strength | ISO527-2/1A/50 MPa | 103 | 129 | 109 | 109 | 107 | 101 | 96 | 95 | 87 | 80 | 85 | 112 |
| Quality (other properties) | Judge Fluidity, thermal characteristics, heat resistance | | ○ | x | ○ | ○ | x | x | ○ | ○ | ○ | x | ○ | ○ |
| | Melt viscosity L/D10, 250° C. | Capilograph 12.16 sec⁻¹ Pa·s | 3,158 | 6,213 | 5,612 | 5,488 | 9,367 | 10,490 | 13,650 | 8,129 | 14,260 | 16,140 | 15,730 | 4,400 |
| | | 60.8 sec⁻¹ Pa·s | 1,774 | 3,244 | 3,177 | 2,912 | 4,375 | 4,951 | 5,518 | 3,842 | 6,585 | 6,724 | 6,548 | 2,400 |
| | | 121.6 sec⁻¹ Pa·s | 1,281 | 2,324 | 2,200 | 2,070 | 2,976 | 3,296 | 3,650 | 2,649 | 4,449 | 4,545 | 4,316 | 1,700 |
| | 0.02 or less water content | Strand diameter 12.16 sec⁻¹ mm | 1.65 | | | | | | | 1.30 | 1.40 | 1.40 | 1.50 | |
| | | 60.8 sec⁻¹ mm | 2.70 | | | | | | | 1.40 | 1.50 | 1.55 | 1.65 | |
| | | 121.6 sec⁻¹ mm | 3.10 | | | | | | | 1.45 | 1.55 | 1.60 | 1.75 | |
| Thermal characteristics | Melting point (DSC Tm-2nd) | ISO 11357-3 °C. | 217 | 214 | 217 | 217 | 214 | 215 | 215 | 213 | 214 | 214 | 216 | |
| | Solidifying point | ISO 11357-3 °C. | 168 | 160 | 163 | 162 | 169 | 171 | 171 | 168 | 170 | 171 | 168 | |
| | Melting point-Solidifying point | °C. | 49 | 55 | 53 | 54 | 46 | 43 | 44 | 45 | 43 | 43 | 48 | |
| | Heat resistance | Tensile stress at yield MPa | | | 80 | 81 | 91 | | 95 | | | 82 | 84 | |

TABLE 1-continued

| | | 5 | 4 | 24 | 23 | | 29 | 37 | |
|---|---|---|---|---|---|---|---|---|---|
| Tensile tested at −60° C. after heat treated at 200° C. for 4.5 hrs | Tensile stress at break % | | | | | | | | |
| Blister resistance 87.5 MPa H₂ gas, presoaked for more than 20 h, evacuated in 0.5 min, one cycle Molding method in parentheses | | Absent (Blow) | Absent (Blow) | Absent (Blow) | Absent (Blow) | Absent (Blow) | Absent (Blow) | Absent (Blow) | Absent (Blow) |
| Judge | | x | ○ | x | ○ | x | x | x | x | ○ |

The composition obtained in Examples attained excellent results in productivity, blow moldability, molded article quality, properties at room and low temperatures, and other properties. The comparison of Example 2 to Examples 4 to 7 shows that the Charpy impact strength at −40° C. is enhanced when not only an olefin-based ionomer but also a specific amount of an impact modifier are added to the polyamide resin. From the comparison of Example 2 to Example 11, the addition of a phosphorus antioxidant as a heat resistant agent results in a molded article having better conditions of the inner surface and higher heat resistance. From the comparison of Comparative Example 1, Examples show that the polyamide resin composition is deteriorated in parison characteristics and also in nominal tensile strain at break when containing no ionomers and no impact modifiers. From the comparison of Example 2 to Examples 12 to 14, good parison characteristics are obtained and an excessive increase in strand diameter is avoided when the melting point or zinc content of the olefin-based ionomer falls in the specified range. The comparison of Example 2 with Comparative Examples 2 and 3 shows that burn marks occur on the inner surface and also the heat resistance is poor when the heat resistant agents include only one organic hindered phenol heat resistant agent. By comparing Examples 1 and 2 with Comparative Examples 4 to 9, it is shown that the polyamide resin composition containing an impact modifier and no ionomers exhibits a high viscosity and is poor in blow moldability and in the quality and productivity of molded articles. Further, when the amount of the impact modifier is large, the tensile modulus at room temperature is low. The comparison of Examples with Comparative Example 10 shows that the polyamide resin composition, when containing an ionomer and an impact modifier and the amount of the ionomer is less than the specified range, exhibits a high viscosity and is poor in blow moldability and in the quality and productivity of molded articles. From the comparison of Example 2 with Comparative Example 11, parison characteristics are deteriorated and molded articles cannot be obtained with a uniform wall thickness when the polyamide resins do not include at least one selected from the group consisting of aliphatic copolyamides and aromatic copolyamides.

The invention claimed is:

1. A polyamide resin composition comprising, based on 100 mass % of the polyamide resin composition, 40 to 84 mass % of a polyamide resin (A), not less than 15 mass % of an olefin-based ionomer (B), 0 to 10 mass % of an impact modifier (C), and 0.1 to 3 mass % of heat resistant agents (D), wherein the polyamide resin (A) comprises an aliphatic copolyamide (A-1), an aromatic copolyamide (A-2) and an aliphatic homopolyamide (A-3), wherein the heat resistant agents (D) comprises two or more kinds of organic hindered phenol heat resistant agents (D-1), wherein the impact modifier (C) is at least one selected from the group consisting of (ethylene and/or propylene)/α-olefin-based copolymers and (ethylene and/or propylene)/(α,β-unsaturated carboxylic acid and/or unsaturated carboxylic acid ester)-based copolymers, and wherein the impact modifier (C) has at least one group selected from the group consisting of a carboxyl group, an acid anhydride group, a carboxylic acid ester group, a carboxylic imide group, a carboxylic amide group and an epoxy group.

2. The polyamide resin composition according to claim 1, wherein the heat resistant agents (D) further comprise a phosphorus heat resistant agent (D-2).

3. The polyamide resin composition according to claim 2, wherein the olefin-based ionomer (B) has a melting point of 75 to 100° C., a density of 940 to 980 kg/m$^3$, and a content of zinc element of not less than 3 mass % as measured by inductively coupled plasma-optical emission spectrometry.

4. The polyamide resin composition according to claim 2, wherein when the resin is extruded into a 15 cm strand at a measurement temperature of 250° C. and a shear rate of 121.6 sec$^{-1}$ in accordance with ISO 11443 using a capillary rheometer having a capillary die 1.0 mm in inner diameter and 10 mm in length, the strand being then sampled and solidified by cooling at room temperature for 24 hours, the diameter of the strand is less than 3.00 mm.

5. The polyamide resin composition according to claim 1, wherein the olefin-based ionomer (B) has a melting point of 75 to 100° C., a density of 940 to 980 kg/m$^3$, and a content of zinc element of not less than 3 mass % as measured by inductively coupled plasma-optical emission spectrometry.

6. The polyamide resin composition according to claim 1, wherein when the resin is extruded into a 15 cm strand at a measurement temperature of 250° C. and a shear rate of 121.6 sec$^{-1}$ in accordance with ISO 11443 using a capillary rheometer having a capillary die 1.0 mm in inner diameter and 10 mm in length, the strand being then sampled and solidified by cooling at room temperature for 24 hours, the diameter of the strand is less than 3.00 mm.

* * * * *